United States Patent [19]

Mancebo

[11] 4,397,294
[45] Aug. 9, 1983

[54] SOLAR WATER HEATING SYSTEM

[76] Inventor: Ronald A. Mancebo, 4320 Old 44 Dr., Redding, Calif. 96003

[21] Appl. No.: 291,281

[22] Filed: Aug. 10, 1981

[51] Int. Cl.³ .................................................. F24J 3/02
[52] U.S. Cl. ..................................... 126/121; 126/422; 126/435; 126/437; 116/227
[58] Field of Search ............... 126/421, 422, 428, 435, 126/437; 116/227

[56] References Cited

U.S. PATENT DOCUMENTS

| | | | |
|---|---|---|---|
| 3,006,314 | 10/1961 | Malec | 116/227 |
| 4,000,851 | 1/1977 | Heilemann | 126/437 |
| 4,034,912 | 7/1977 | Hayes | 126/400 |
| 4,037,785 | 7/1977 | Madern | 126/400 |
| 4,052,000 | 10/1977 | Honikman | 219/279 |
| 4,083,490 | 4/1978 | Cunningham | 165/106 |
| 4,130,110 | 12/1978 | Bottum | 126/435 |
| 4,207,866 | 6/1980 | Boyd | 126/420 |
| 4,253,446 | 3/1981 | Muller | 126/435 |
| 4,256,089 | 3/1981 | Lewis et al. | 126/420 |
| 4,326,499 | 4/1982 | Koskela | 126/435 |

Primary Examiner—Carroll B. Dority, Jr.
Attorney, Agent, or Firm—Leonard Dale Schappert

[57] ABSTRACT

A solar water heating system is provided which includes a domestic pressurized water tank with a non-pressurized solar water storage tank placed directly atop it. Because the solar loop is non-pressurized and because the fluid (water) used in said solar loop is non-toxic, a single-wall heat exchanger may be used. Draindown is accomplished by the use of a vacuum relief valve which permits draindown whenever the pump in the solar loop is not active. A differential thermostat, in conjunction with a sensor at the collector and a sensor at the domestic water tank, senses temperature variation and activates the pump in the solar loop and the pump in the heat exchanger loop whenever a given temperature variation occurs. High efficiency is achieved through the proper placement of extraction and expulsion pipes in the domestic water storage tank, as well as the placement of the pumps within the center of the solar water storage tank and the use of a single-wall heat exchanger.

6 Claims, 3 Drawing Figures ic water heating system. The invention consists essentially of a pressurized domestic water tank which utilizes an electrical heating element as backup power should the solar radiation be insufficient to meet the hot-water requirements of the system. In addition to the domestic hot-water tank, a storage tank is provided which holds the solar-heated water. A pump is utilized which pumps the water from the solar storage tank to the collector and back to the solar storage tank. The solar storage tank is non-pressurized, and can be filled from the outside. A single-wall heat-exchanger coil is placed within the solar-heated water storage tank, and water from the domestic hot-water tank is routed through the heat exchanger, thereby absorbing heat from the solar storage tank water, and back into the domestic hot-water system. The pump in series with the heat exchanger is positioned in such a way that the water is drawn from the bottom of the domestic water tank and is re-injected into the domestic water tank at a higher level, thereby increasing the efficiency of the exchanger system. A differential thermostat is utilized which is connected to two sensors, one at the bottom of the domestic water tank, and the other at the solar collector. When a given temperature variation is reached between the solar collector and the lower part of the domestic water tank, the differential thermostat actuates both the pump which pumps water from the solar storage tank through the solar collector and back into the storage tank, and the pump which pumps water from the bottom of the domestic hot-water tank through the exchanger coil and back into the domestic water tank.

SOLAR WATER HEATING SYSTEM

BACKGROUND OF THE INVENTION

1. Field of the Invention

This invention relates to domestic solar supplemental water heating systems, and more specifically to systems with a high efficiency and low cost factor.

2. Description of the Prior Art

In the past, various domestic solar water heating systems have been proposed as a way of conserving fuel and increasing energy efficiency. Most of these systems consist of a solar collector in conjunction with a coil of copper tubing or some equivalent tubing placed within a water heating tank. In these closed-loop systems, freeze protection is gained through the use of an automatic drain valve which opens and permits the system to drain when freezing temperatures are reached at the collector. This creates a problem in that the system has to be recharged each time a freeze occurs. The system was improved by the use of fluid within the solar loop which has a very low freezing point, thereby reducing the necessity of a drainback provision. Most of these fluids are somewhat toxic and, as a result of the use of such fluids, the heat-exchanger coil within the hot water tank requires double-wall construction to prevent intrusion of the potentially toxic fluid into the domestic water system should a break occur in the solar loop. The dual-wall construction of the heat exchanger reduces the efficiency considerably, thereby reducing the benefit gained by use of the system.

Other approaches used recently include the use of a non-pressurized tank for storage of the solar-heated water, in conjunction with a pressurization system which routes the solar-heated water into the domestic water supply. The benefit gained in this type of system is the automatic draindown of the water should the pumps not be operating to circulate the water through the solar collector. The disadvantage of this type of system is that it requires a high-pressure pump in order to get the solar-heated water back into the pressurized domestic water heating system.

Most of the prior art, while it increased the efficiency of domestic water heating systems, involved several disadvantages, as noted above, because of its internal design. Prior art patents which may be pertinent to the examination of this application are U.S. Pat. Nos. 4,034,912; 4,037,785; 4,052,000; 4,083,490; 4,207,866; 4,253,446.

SUMMARY OF THE INVENTION

This invention provides a novel solar-assisted domes-

A dipstick arrangement is provided which permits an individual to check the water level in the solar water storage tank. This arrangement eliminates the problem of tanks overflowing as a result of the use of automatic ballcock systems to maintain sufficient water level.

The complete water-heating system comprises a compact system with the domestic hot-water tank on the bottom and the solar storage tank immediately above the domestic hot-water tank, with an opening in the center of the solar storage tank, thereby permitting the pumps to be placed within the unit, and thereby constituting a compact, efficient water heating system. Freeze protection is afforded by the fact that, any time the pump powering the solar loop is not turned on, the system automatically drains back into the solar storage tank.

One of the objectives of the present invention is to provide a compact, easily maintained water heating system which is easily retrofitted into an existing home.

Another objective of the present invention is to provide a solar water heating system which provides freeze protection without relying upon an electronic valve which might easily become corroded and stuck.

Another objective of the present invention is to provide a solar water heating system which, because it does not require dual-wall construction of the heat exchanger, increases efficiency considerably.

Another objective of the present invention is to provide a solar water heating system wherein all the components, excepting the collector and connecting pipes, are located within a main body, thereby reducing the complexity of the system from the point of view of the consumer.

The foregoing objectives, along with multiple other objectives, will become much more apparent in the following descriptions of the drawings, description of the preferred embodiment, and claims.

DESCRIPTION OF THE PREFERRED EMBODIMENT

Figures 1, 1A:
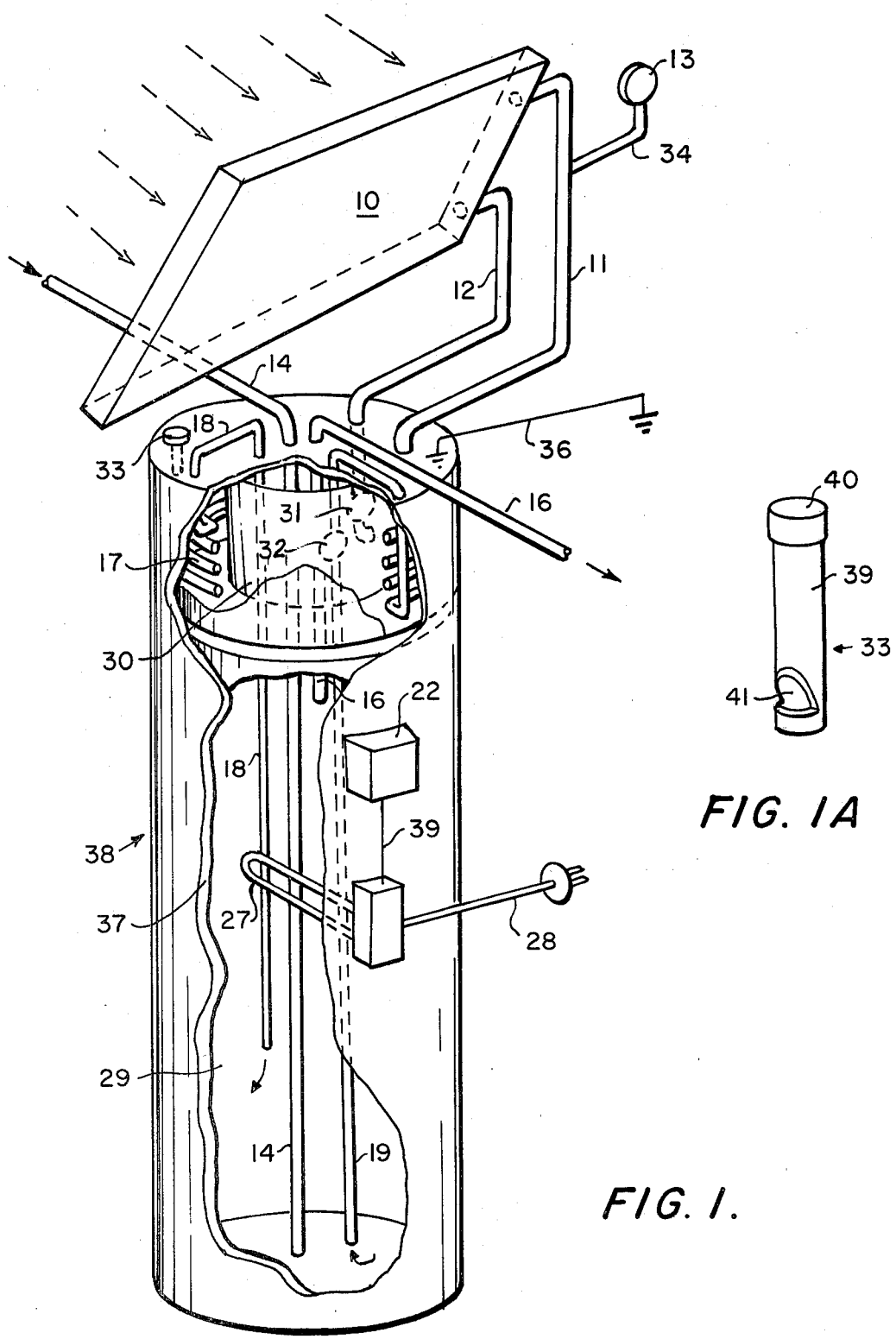
FIG. 1 is a perspective view showing the complete solar water heating system and, through the use of a cutaway section, showing the outer wall of the tank and the placement of the heat exchanger unit within the solar storage tank portion. This view also shows the placement of the pumps within the inner wall of the solar storage tank portion of the unit.
FIG. 1A shows the dipstick for checking water level in the solar storage tank portion of the system.
Figure 2:
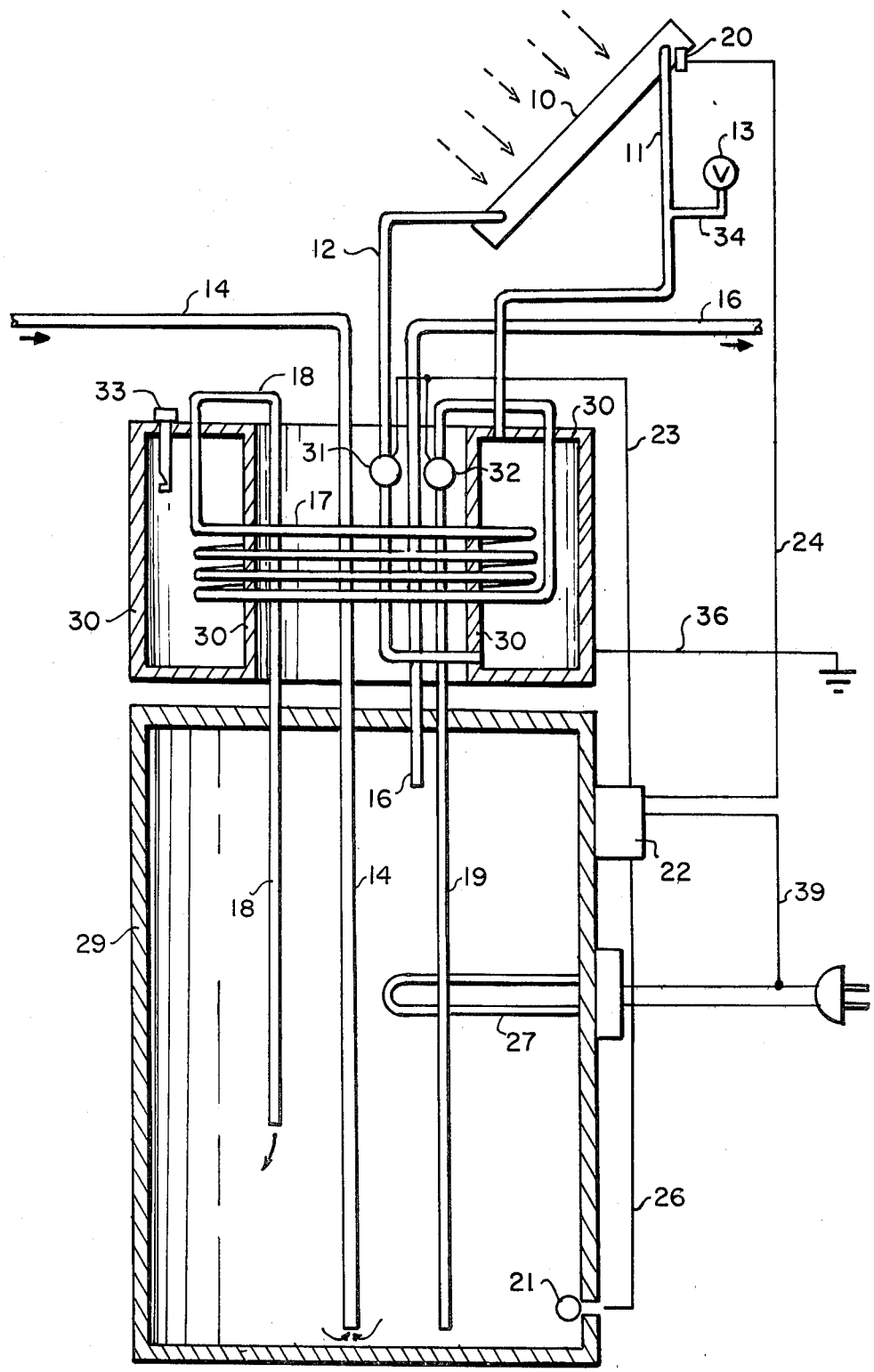
FIG. 2 shows a detailed view of the structural components of the system and the placement of the structural components within the package.

As will be noted when viewing FIGS. 1 and 2 of the drawings, each of these drawings is a representation of the complete solar water heating system. While FIG. 1 is a perspective view and therefore much more useful in visualizing the physical structure of the system, FIG. 2 is much more useful in understanding the theoretical aspects of operation of the system. Therefore, in discussion of the complete system, FIGS. 1 and 2, being numbered identically, should both be referred to in considering the preferred embodiment.

FIG. 1A of the drawings shows a dipstick (33) which consists of a piece of pipe (39) with a cutout (41) just above the bottom of the piece of pipe (39). The bottom of the dipstick (33) is closed and welded. The top portion of the dipstick (40) is permanently attached to the pipe (39), and keeps the dipstick (33) from penetrating farther into the solar water storage tank than is desired. As will be seen in later discussions of the preferred embodiment, prior to operating the system, the solar-heated water tank portion of the system is filled with water manually. The dipstick (33) penetrates into the solar-heated water storage tank, as noted in FIGS. 1 and 2, and allows an individual to determine whether the water level in the solar-heated water storage tank is sufficient to permit operation of the system. When inserted into the tank as shown in FIG. 1, the dipstick (33) indicates that there is sufficient water in the tank when the bottom portion of the pipe (39) fills up with water through cutout (41).

Having defined the action of the dipstick (33), we proceed to a discussion of the full system.

As can be seen in FIGS. 1 and 2, the full system includes a solar collector (10) and connecting pipes (11) and (12) which connect the solar collector (10) to the solar storage tank (30). A vacuum relief valve (13) is provided and attached through pipe (34) to one of the pipes going between the solar collector (10) and the solar-heated water storage tank (30). This vacuum relief valve (13) permits the system to drain down when the pump (31) is not in operation. The solar-heated water storage tank (30) is a cylindrical unit consisting of a more or less doughnut-shaped tank. The center part of the tank is open, thereby permitting the placement of the pumps (31) and (32) and associated pipes and equipment within the top portion of the system. The solar pipe (11) connects to the solar-heated water storage tank (30), and the solar pipe (12) connects to pump (31), which in turn connects to the solar-heated water storage tank (30). The solar-heated water storage tank (30) is non-pressurized, and in fact is open where the dipstick (33) fits into it. Because the system is non-pressurized, water is present in the solar collector (10) only when pump (31) is operative; otherwise, the water drains down from the solar collector (10) through the function of the vacuum relief valve (13), which is connected to solar pipe (11). A single-wall heat exchanger (17) is placed within the solar-heated water storage tank (30) and connected through pipe (18) and through pump (32) and pipe (19) to the domestic hot water storage tank (29). The heat exchanger (17) in this instance is pressurized at the level of the domestic water system pressure, and need only be of single-wall construction, as pressure of the domestic water system is great enough to prevent intrusion of the solar-heated water should a break occur in the exchanger. In operation, the heat exchanger (17) extracts water from the domestic hot water system at the bottom of the tank through pipe (19). The water is pumped through the heat exchanger (17) by pump (32) and heated by the solar-heated water, then expelled back into the domestic water storage tank (29) through pipe (18). As can be seen in both FIGS. 1 and 2, the solar-heated water storage tank (30) is placed directly atop the domestic water storage tank (29). This is done in order to increase efficiency and to reduce the size and complexity of the complete system. Because essentially no pipes are exposed, the efficiency is increased considerably due to reduction of heat loss through exposed pipes. A backup heating element (27) is provided in the domestic hot water storage tank (29), and is placed at a level higher than the entry and exit levels of water being heated by the heat exchanger (17). The thermosyphon principle mandates that this be the positioning of the backup electrical heating system in order to increase efficiency. Because the heat exchanger (17) picks up the water from the bottom of the domestic hot water storage tank (29), it is always picking up the coldest water in that tank, thereby retaining the greatest temperature differential possible between the water in the solar-heated water storage tank (30) and the water flowing through the heat exchanger (17). The efficiency of the system is directly related to this temperature difference, and increases considerably as the temperature variation increases.

When the system is in use—that is, when domestic water is being used within the house—the outside cold water comes through the cold-water inlet pipe (14) and enters the domestic hot water storage tank (29) at the very bottom of the tank, a position essentially parallel to that where the heat exchanger (17) picks up the water through pipe (19) for heating. The warm-water outlet pipe (16) accepts water from the top of the domestic hot water storage tank (29), thereby using the hottest water within the domestic hot water storage tank (29). This also increases the efficiency of the system, as noted above.

The electrical operation of the solar heating system is controlled through the use of a differential thermostat (22) which is connected through line (24) to temperature sensor (20) attached to solar collector (10), and through line (26) to temperature sensor (21) placed at the bottom of the domestic hot water storage tank (29). When the differential thermostat (22), through sensors (20) and (21), senses a pre-set temperature variation, it actuates pumps (31) and (32) through line (23). As a result, water is pumped from the domestic hot water storage tank (29) through pipe (19), through heat exchanger (17) and back into the domestic hot water storage tank (29), simultaneously with water being pumped from the solar-heated water storage tank (30) through pump (31), through solar collector (10) and back into the solar-heated water storage tank (30). Because both pumps (31) and (32) are controlled by the same control line (23) through the use of differential thermostat (22), the complexity and, consequently, required maintenance of the system are considerably reduced. In actual operation, the water heated through the heat exchanger (17) is always routed into the domestic hot water storage tank (29) at a level higher than that from which it is extracted, thereby heating the water in the upper part of the storage tank and reducing the required use of the backup heating element (27).

Now going back to FIG. 1, it is noted that the solar-heated water storage tank (30) is directly atop the domestic hot water storage tank (29). Once these two tanks are assembled together, they are enclosed in an outer shell (38) made generally of metal, with insulation material (37) packed between the outer shell (38) and the solar-heated water storage (30) and domestic hot water storage tank (29). As can be further noted, there are only four water connections to the system: pipes (11) and (12), which connect the solar loop of the system, and pipe (14), cold water inlet, and pipe (16), warm water outlet from the domestic hot water storage tank (29). All other components relating to water flow are contained within the package. The differential thermostat (22) and the heating element (27) are integrated into the outer surface (38) of the metal tank, thereby making the system more compact and less complex.

The foregoing has been a description of a preferred embodiment only and, understanding that multiple variations and innovations will occur to those skilled in the art, the applicant does not intend that the preferred embodiment limit the scope of the protection provided by this patent, except to that extent to which the following claims limit the scope of the application.

I claim:

1. A solar water-heating system comprising:
   a. a domestic water storage tank having a cold-water inlet and a hot-water outlet;
   b. a non-pressurized solar-heated water storage tank placed directly atop said domestic water storage tank and having an open area in the center;
   c. a heat exchanger placed inside said non-pressurized solar-heated water storage tank and connected through two pipes to said domestic water storage tank;
   d. first pump means for pumping heated liquid through said non-pressurized solar-heated water storage tank;
   e. second pump means for pumping water from said domestic water storage tank through said heat exchanger and back into said domestic water storage tank;
   f. a solar collector, and
   g. means for connecting said solar collector to said non-pressurized solar-heated water storage tank.

2. The invention of claim 1, wherein said first pump means and said second pump means are placed inside said open area of said non-pressurized solar-heated water storage tank.

3. The invention of claim 1 or 2, wherein:
   a. said water pumped through said heat exchanger is extracted from said domestic water storage tank near the bottom of said domestic water storage tank;
   b. said water pumped through said heat exchanger is expelled into said domestic water storage tank at a point higher than that at which it is extracted;
   c. said cold water inlet expells incoming water into said domestic water storage tank at a point near the bottom of said domestic water storage tank, and
   d. said hot-water outlet extracts water from said domestic water storage tank from a point near the top of said domestic water storage tank.

4. The invention of claim 3, wherein:
   a. said non-pressurized solar-heated water storage tank has a hole in its top for use in refilling and testing the water level in said non-pressurized solar-heated water storage tank, and
   b. a dipstick is provided which fits into said hole whereby the water level in said non-pressurized solar-heated water storage tank is checked.

5. The invention of claim 1 or 2, including:
   a. a temperature sensor "A" placed on said solar collector;
   b. a temperature sensor "B" placed near the bottom of said domestic water storage tank, and
   c. a differential thermostat electrically connected to said temperature sensor "A" and said temperature sensor "B" which senses the difference in temperature between said temperature sensor "A" and said temperature sensor "B," and which is also electrically connected to and which activates said means for pumping water from said domestic water storage tank and said means for pumping water from said non-pressurized solar-heated water storage tank when a pre-set temperature variation occurs between said temperature sensor "A" and said temperature sensor "B."

6. The invention of claim 3, including:
   a. a temperature sensor "A" placed on said solar collector;
   b. a temperature sensor "B" placed near the bottom of said domestic water storage tank, and
   c. a differential thermostat electrically connected to said temperature sensor "A" and said temperature sensor "B" which senses the difference in temperature between said temperature sensor "A" and said temperature sensor "B," and which is also electrically connected to and which activates said means for pumping water from said domestic water storage tank and said means for pumping water from said non-pressurized solar-heated water storage tank when a preset temperature variation occurs between said temperature sensor "A" and said temperature sensor "B."

* * * * *